US006924934B2

(12) United States Patent
Schilling et al.

(10) Patent No.: US 6,924,934 B2
(45) Date of Patent: Aug. 2, 2005

(54) DIFFRACTIVE SAFETY ELEMENT

(75) Inventors: Andreas Schilling, Hagendorn (CH); Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/499,722

(22) PCT Filed: Nov. 2, 2002

(86) PCT No.: PCT/EP02/12245

§ 371 (c)(1),
(2), (4) Date: Aug. 9, 2004

(87) PCT Pub. No.: WO03/055691

PCT Pub. Date: Jul. 10, 2003

(65) Prior Publication Data

US 2005/0068625 A1 Mar. 31, 2005

(30) Foreign Application Priority Data

Dec. 22, 2001 (CH) .............................................. 2364/01

(51) Int. Cl.$^7$ .................................................. G02B 5/18

(52) U.S. Cl. ....................... 359/576; 359/569; 359/571; 359/572; 359/566; 283/86; 283/94

(58) Field of Search ................................ 359/576, 571, 359/572, 569, 566, 1, 2; 283/86, 91, 94

(56) References Cited

U.S. PATENT DOCUMENTS 4,155,627 A * 5/1979 Gale et al. .................. 359/568
4,856,857 A 8/1989 Takeuchi et al.
5,841,555 A * 11/1998 Bianco et al. ................. 359/2
5,991,078 A * 11/1999 Yoshitake et al. .......... 359/567
6,715,797 B2 * 4/2004 Curiel ......................... 283/67

FOREIGN PATENT DOCUMENTS

| | | |
|---|---|---|
| EP | 0 105 099 A1 | 4/1984 |
| EP | 0 360 969 A1 | 4/1990 |
| EP | 0 375 833 A1 | 7/1990 |
| EP | 0 712 012 A1 | 5/1996 |
| WO | WO 97/19821 | 6/1997 |
| WO | WO 99/47983 | 9/1999 |

* cited by examiner

*Primary Examiner*—Fayez G. Assaf
(74) *Attorney, Agent, or Firm*—Hoffmann & Baron, LLP

(57) ABSTRACT

A security element (2) comprising a plastic laminate (1) has a surface pattern which is composed mosaic-like at least from surface elements, wherein in the surface elements a reflecting interface (8) between a shaping layer (5) and a protective layer (6) of the plastic laminate (1) forms optically effective structures (9). Light (11) which is incident on the plastic laminate (1) and which passes through a cover layer (4) of the plastic laminate (1) and through the shaping layer (5) is deflected in a predetermined manner by means of the optically effective structures (9). Shaped in the surface of at least one of the surface elements is a diffraction structure which is produced by a superimposition of a linear asymmetrical diffraction grating (24) with a matt structure. The linear asymmetrical diffraction grating (24) has a spatial frequency from the range of values of between 50 lines/mm and 2,000 lines/mm. The matt structure has a mean roughness value from the range of between 20 nm and 2,000 nm and at least in one direction a correlation length of between 200 nm and 50,000 nm.

11 Claims, 3 Drawing Sheets

DIFFRACTIVE SAFETY ELEMENT

This application claims priority based on an International Application filed under the Patent Cooperation Treaty, PCT/EP02/12245, filed on Nov. 2, 2002, and Swiss Patent Application No. 20012364/01, filed on Dec. 22, 2001, both of which are incorporated herein by reference in their entirety.

BACKGROUND OF THE INVENTION

The invention relates to a diffractive security element as set forth in the classifying portion of claim 1.

Diffractive security elements of that kind are used for the verification of articles such as banknotes, passes and identity cards of all kinds, valuable documents and so forth in order to be able to establish the authenticity of the article without involving a high level of cost. When the article is issued the diffractive security element is fixedly joined thereto, in the form of a stamp portion cut from a thin layer composite.

Diffractive security elements of the kind set forth in the opening part of this specification are known from EP 0 105 099 A1 and EP 0 375 833 A1. Those security elements include a pattern of surface elements which are arranged in a mosaic-like fashion and which have a diffraction grating. The diffraction gratings are azimuthally predetermined in such a way that, upon a rotary movement, the visible pattern produced by diffracted light optically changes.

EP 0 360 969 A1 describes diffractive security elements in which the surface elements have asymmetrical diffraction gratings. The asymmetrical diffraction gratings are arranged in paired and mirror image symmetrical relationship in each two surface elements with a common boundary. Special asymmetrical diffraction gratings which act like inclinedly positioned mirrors are described in WO 97/19821.

The diffraction properties of the diffraction grating can be represented as an image on the basis of a Fourier space representation. That representation, in a circle, indicates the direction of the diffracted light beams by means of a point, the light being incident perpendicularly onto the diffraction grating at the center of the circle. The center of the circle corresponds to the diffraction angle $\beta=0°$ and the periphery corresponds to the diffraction angle $\beta=90°$, while a radius at a point in the circle indicates the diffraction angle $\beta$ of the light beams diffracted at the diffraction gratings. Polar angles of various points in the Fourier space representation reflect the azimuthal orientation of the diffraction gratings.

The diffractive security elements generally comprise a portion of a thin layer composite of plastic material. The interface between two of the layers has microscopically fine reliefs of light-diffracting structures. To enhance reflectivity, the interface between the two layers is covered with a reflection layer. The structure of the thin layer composite and the materials which can be used for that purpose are described for example in U.S. Pat. No. 4,856,857 and WO 99/47983. It is known from DE 33 08 831 A1 for the thin layer composite to be applied to the article by means of a carrier film.

The disadvantage of such diffractive security elements lies in the narrow solid angle and the extremely high level of surface brightness, at which a surface element covered with a diffraction grating is visible to an observer. The high level of surface brightness can also make it difficult to recognize the shape of the surface element.

It is also known from EP 0 712 012 A1 for microscopically fine stochastic roughness to be superimposed on a sinusoidal, submicroscopically fine diffraction grating, in such a way that the diffraction grating is stochastically modulated. The microscopically fine stochastic roughness is not further described and is produced by anisotropic process steps which cannot be reproduced, in manufacture of the master die. The submicroscopically fine diffraction grating alone, when directed light is involved, is visible only at the reflection angle. The roughness which is superimposed on the diffraction grating provides that the light diffracted at the submicroscopically fine diffraction grating is scattered into the half-space over the diffraction grating.

SUMMARY OF THE INVENTION

The object of the invention is to provide an inexpensive, diffractive security element which in diffracted light shows a clearly visible static surface pattern in a large angular range.

According to the invention that object is attained by the features recited in the characterizing portion of claim 1. Advantageous configurations of the invention are set forth in the appendant claims.

BRIEF DESCRIPTION OF THE DRAWINGS

Embodiments by way of example of the invention are described in greater detail hereinafter and are illustrated in the drawing in which.

DESCRIPTION OF THE PREFERRED EMBODIMENTS

Figure 1:
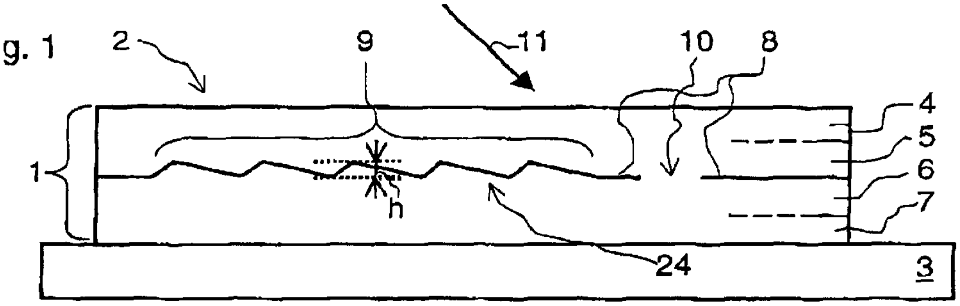
FIG. 1 is a view in cross-section of a security element.

In FIG. 1 reference 1 denotes a layer composite, 2 a security element, 3 a substrate, 4 a cover layer, 5 a shaping layer, 6 a protective layer, 7 an adhesive layer, 8 a reflecting interface, 9 an optically effective structure and 10 a transparent location in the reflecting interface 8. The layer composite 1 comprises a plurality of layer portions of various plastic layers which are applied successively to a carrier film (not shown here) and in the specified sequence typically includes the cover layer 4, the shaping layer 5, the protective layer 6 and the adhesive layer 7. In an embodiment the carrier film is the cover layer 4 itself while in another embodiment the carrier film serves for application of the thin layer composite 1 to the substrate 3 and is thereafter removed from the layer composite 1, as described in above-mentioned DE 33 08 831 A1.

The interface 8 forms the common boundary surface between the shaping layer 5 and the protective layer 6. The optically effective structures 9 of an optically variable pattern are shaped into the shaping layer 5. As the protective layer 6 fills the valleys of the optically effective structures 9, the interface 8 is of the same shape as the optically effective structures 9. In order to achieve a high level of reflectivity in respect of the optically effective structures 9, a jump in the refractive index is required at the interface 8. That jump in refractive index is produced for example by a metal coating, preferably of aluminum, silver, gold, copper, chromium, tantalum and so forth which as the interface 8 separates the shaping layer 5 and the protective layer 6. As a consequence of its electrical conductivity the metal coating provides a high reflection capability for visible light at the interface 8. Instead of a metal coating the jump in refractive index may also be produced by a coating of an inorganic dielectric material, with the advantage that the dielectric coating is additionally transparent. Suitable dielectric materials are listed for example in above-mentioned U.S. Pat. No. 4,856,857, Table 1 and in WO 99/47983.

The layer composite 1 can be produced in the form of a plastic laminate in the form of a long film web with a plurality of mutually juxtaposed copies of the optically variable pattern. The security elements 2 are for example cut out of the film web and joined to a substrate 3 by means of the adhesive layer 7. The substrate 3, mostly in the form of a document, a banknote, a bank card, a pass or identity card or another important or valuable article, is provided with the security element 2 in order to verify the authenticity of the article.

At least the cover layer 4 and the shaping layer 5 are transparent in relation to visible light 11 which is incident on the security element 2. The incident light 11 is reflected at the interface 8 and deflected in a predetermined manner by the optically effective structure 9. The optically effective structures 9 are diffractive structures, light-scattering relief structures, flat mirror surfaces and so forth.

Figure 2:
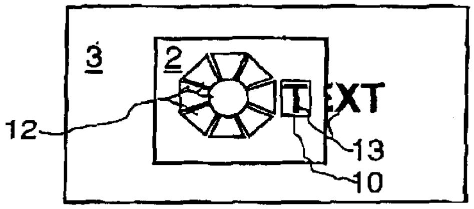
FIG. 2 is a plan view of the security element.

FIG. 2 shows a plan view of the security element 2 applied to the substrate 3. Surface elements 12 form a mosaic-like surface pattern in the plane of the security element 2. Each surface element 12 is occupied with one of the optically effective structures 9 (FIG. 1). In an embodiment of the security element 2 transparent locations 10 at which the reflecting metal coating is interrupted are let into the interface 8 (FIG. 1) so that indicia 13 which are under the security element 2 and which are disposed on the substrate 3 are perceptible through the security element 2. In another embodiment of the security element 2 the interface 8 has a transparent dielectric coating so that the indicia 13 under the security element 2 remain visible. It will be appreciated that, in those transparent structures, the protective layer 6 (FIG. 1) and the adhesive layer 7 (FIG. 1) are also transparent. For particularly thin embodiments of the layer composite 1 (FIG. 1) the protective layer 6 is omitted. The adhesive layer 7 is then applied directly to the optically effective structures 9. Advantageously, the adhesive is a hot melt adhesive which only develops its adhesiveness at a temperature around 100° C. Various embodiments of the layer composite 1 and the materials which can be used for same are listed in above-mentioned U.S. Pat. No. 4,856,857.

A diffraction grating 24 (FIG. 1) is determined by its parameters spatial frequency, azimuth, profile shape, profile height h (FIG. 1) and so forth. The linear asymmetrical diffraction gratings 24 referred to in the examples described hereinafter have a spatial frequency in the range of between 50 lines/mm and 2,000 lines/mm, the range of between 100 lines/mm and about 1,500 lines mm being preferred. The geometrical profile height h is of a value in the range of between 50 nm and 5,000 nm, preferred values being between 100 nm and 2,000 nm. As shaping of the diffraction gratings 24 in the shaping layer 5 (FIG. 1) is technically difficult for geometrical profile heights h which are greater than the reciprocal value of the spatial frequency, high values in respect of the geometrical profile height h are appropriate only when the values in respect of the spatial frequency are low.

Figure 3:
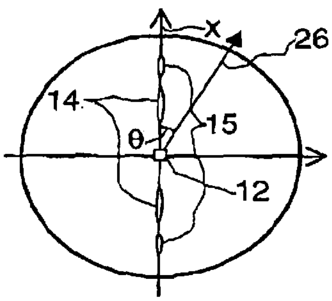
FIG. 3 is a Fourier space representation of a linear diffraction grating.

FIG. 3 illustrates the diffraction properties of a linear diffraction grating 24 (FIG. 1) on the basis of the above-described Fourier space representation with first and second diffraction orders 14,15, wherein a grating vector 26 of the diffraction grating 24 is parallel to the direction x. The diffraction grating 24 of the surface element 12 arranged at the center of the circle breaks down the light 11 which is incident perpendicularly onto the plane of the drawing (FIG. 1) into spectral colors. Beams of the diffracted light of the various diffraction orders 14, 15 are in the same diffraction plane which is determined by the incident light 11 and the grating vector 26 and which cannot be represented here, and are therefore strongly directional. Shorter-wave light of a wavelength λ=380 nm (violet), in each of the diffraction orders 14, 15, is at a shorter distance from the center point of the circle than longer-wave light of the wavelength λ=700 nm (red). The number of propagating diffraction orders 14, 15 depends on the spatial frequency of the diffraction grating 24. The higher diffraction orders overlap in the range below a spatial frequency of about 300 lines/mm so that there the diffracted light is achromatic. After rotation of the linear diffraction grating 24 in the azimuth through the angle θ of a few degrees of angle the surface element 12 which is occupied with the diffraction grating 24 becomes invisible to an observer looking onto the diffraction grating 24 from the direction of the x-co-ordinate, as the grating vector 26 and therewith the diffraction plane with the beams of the diffracted light no longer face in the direction of the x-co-ordinate.

On a microscopic scale the matt structures have fine relief structure elements which determine the scatter capability and which can only be described with statistical characteristic values such as for example mean roughness value $R_a$, correlation length $l_c$, and so forth, wherein the values for the mean roughness $R_a$ are in the range of between 20 nm and 2,000 nm with preferred values of between 50 nm and 500 nm, while the correlation length $l_c$ in at least one direction involves values in the range of between 200 nm and 50,000 nm, preferably between 500 nm and 10,000 nm.

Figure 4:
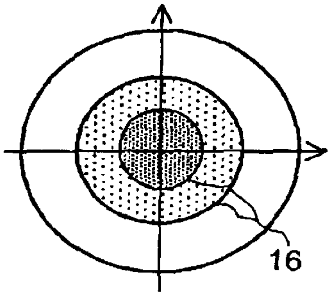
FIG. 4 shows the Fourier space representation of an isotropic matt structure.

FIG. 4 shows the Fourier space representation for the surface element 12 (FIG. 3) occupied by an isotropic matt structure, with perpendicularly incident light 11 (FIG. 1). The microscopically fine relief structure elements of the isotropic matt structure do not have any preferred azimuthal direction, for which reason the scattered light, with an intensity greater than a predetermined limit value, for example predetermined by visual perceptibility, is distributed uniformly in a solid angle 16 predetermined by the scatter capability of the matt structure, in all azimuthal directions, and the surface element 12 appears white to gray in daylight. In all other directions the surface element 12 is dark. Strongly scattering matt structures distribute the scattered light into a larger solid angle 16 than a weakly scattering matt structure.

Figure 5:
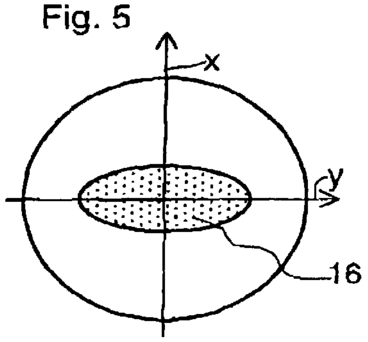
FIG. 5 shows the Fourier space representation of an anisotropic matt structure.

In FIG. 5 the relief elements of the matt structure involve a preferred direction in respect of the microscopically fine relief structure elements in parallel relationship with the co-ordinate x. The scattered light therefore involves an anisotropic distribution. In the representation in FIG. 5, the solid angle 16 which is predetermined by the scatter capability of the matt structure is spread in an elliptical configuration in the direction of the co-ordinate y.

Figure 6:
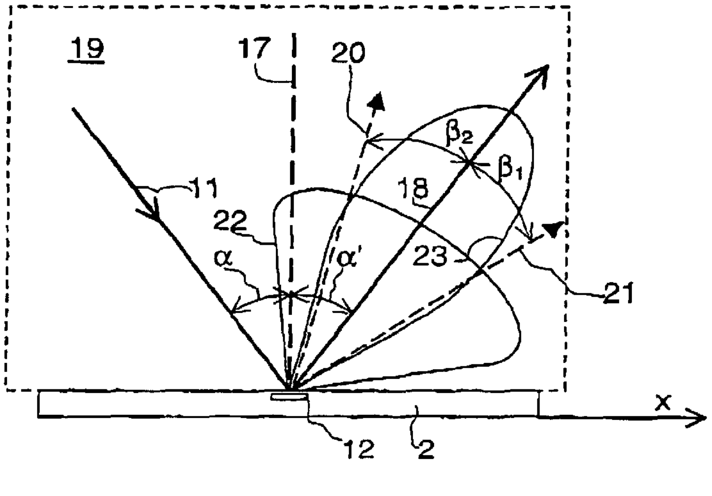
FIG. 6 shows deflection characteristics of optically effective structures.

FIG. 6 shows that situation in cross-section. The security element 2 has the pattern of the surface elements 12 which are occupied with the optically effective structures 9 (FIG. 1). A flat mirror surface reflects the light 11 which is incident at a angle of incidence a relative to the line 17 normal to the surface in the form of a reflected beam 18 at the reflection angle $\alpha'$, wherein $\alpha=\alpha'$. The direction of the incident light 11, the surface normal 17 and the reflected beam 18 together define a diffraction plane 19 arranged in parallel relationship with the plane of the drawing in FIG. 6. The optically effective structure 9 is in the form of the linear diffraction grating 24 (FIG. 1), the grating vector 26 (FIG. 3) of which is oriented in parallel relationship with the co-ordinate x. The incident light 11 is deflected in accordance with its wavelength $\lambda$ at the diffraction angles $\beta_1$, $\beta_2$ as diffracted beams 20, 21 in each of the diffraction orders 14 (FIG. 3), 15 (FIG. 3), from the direction of the reflected beam 18. If the optically effective structure 9 is one of the matt structures the end points of intensity vectors of the backscattered light form lobe-shaped areas. The lobe-shaped areas intersect the diffraction plane 19 for example at section curves 22, 23. If the relief structure elements of the matt structure do not have any preferred direction, the light beams are scattered almost concentrically around the direction of the reflected beam 18. The matt structure with the section curve 22 scatters the incident light 11 to a greater degree and into a larger solid angle 16 (FIG. 4) than a matt structure with the section curve 23. Because of the stronger scatter effect the intensity of the light scattered in the direction of the reflected beam 18 is weaker as is shown by the section curve 22 in comparison with the curve 23. If the relief structure elements are oriented substantially in relation to a preferred direction, here perpendicularly to the diffraction plane 19, then the locations of equal intensity are disposed on flattened, lobe-shaped areas which are of an elliptical cross-section in a section plane (not shown here) which is perpendicular to the reflected beam 18, in which case on the section plane the center of gravity of the area of the cross-section coincides with the intersection point of the reflected beam 18 and the longitudinal axis of the elliptical cross-section is oriented perpendicularly to the diffraction plane 19. Distribution of the scattered light is therefore anisotropic. In contrast to diffraction structures the matt structures cannot divide up the incident light 11 into the spectral colors.

Upon diffraction of the incident light 11 at the asymmetrical linear diffraction grating 24 shown in FIG. 1, the intensity $I^-$ of the diffracted beam 20 (FIG. 6) in the negative diffraction order 14 (FIG. 3), 15 (FIG. 3) and the intensity $I^+$ of the diffracted beam 21 (FIG. 6) in the positive diffraction order 14, 15 are different. The intensity $I^+$ of the diffracted beam 21 exceeds the intensity $I^-$ of the diffracted beam 20 at least by a factor p=3, preferably p=10 or greater, that is to say $I^+=p\cdot I^-$. The factor p substantially depends on the configuration of the sawtooth-shaped profile of the diffraction grating 24, the profile height h and the spatial frequency. Below a spatial frequency of about 300 lines/mm the asymmetrical diffraction grating 24 acts like an inclined mirror, that is to say the intensity $I^+$ of the diffracted beam 21 in the positive diffraction orders almost attains the intensity of the incident light 11 while the intensity $I^-$ of the diffracted beam 20 in the negative diffraction orders is practically vanishingly small. The factor p reaches values of 100 or more. The incident light 11 is no longer divided into the spectral colors, and for that reason such diffraction gratings 24 are characterized by the addition of "achromatic". More in that respect can be found in above-mentioned document WO 97/19821.

Figure 7:
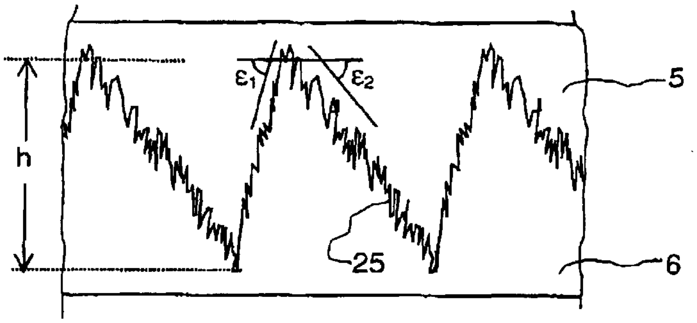
FIG. 7 shows a diffraction structure in a layer composite.

FIG. 7 is a diagrammatic view showing the optically effective structure 9 (FIG. 1) which is embedded in the shaping layer 5 and the protective layer 6 and which is a diffraction structure 25, produced by additive superimposition, of the linear asymmetrical diffraction grating 24 (FIG. 1) and the matt structure. For reasons relating to the drawing the matt structure is shown with a mean roughness value $R_a$ which is small in comparison with the profile height h, and much too regularly. The profile of the linear asymmetrical diffraction grating 24, as further parameters, has blaze angles $\epsilon_1$ and $\epsilon_2$ which both include profile areas of the asymmetrical diffraction grating 24 with the plane of the security element 2 (FIG. 6).

Figure 8:
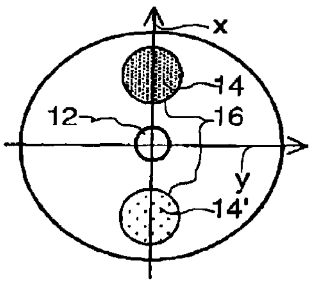
FIG. 8 shows the Fourier space representation of the diffraction structure.

FIG. 8 shows the Fourier space of the diffraction structure 25 (FIG. 7), the matt structure being isotropic. The beams 20 (FIG. 6), 21 (FIG. 6) which are diffracted in strongly directional form by means of the diffraction grating 24 (FIG. 1) are expanded by the matt structure. That affords the advantage that the diffracted beams 20, 21 are emitted into the large solid angles 16 and that for the observer the surface element 12 with the diffraction structure 25 can be easily perceived in the entire solid angle 16, even if with a reduced level of surface brightness. The greater the scattering effect of the matt structure, the correspondingly greater is the solid angle 16 at which the surface element 12 can be perceived and the correspondingly lower is the level of surface brightness of the surface element 12 for the observer. In addition the intensity $I^+$ of the beams 20 which are diffracted into the plus first diffraction order 14 is greater by the factor p than the intensity $I^-$ of the beams 21 which are diffracted into the minus first diffraction order 14'. That is illustrated in the drawing in FIG. 7 by dot rasters of differing densities in the solid angles 16.

For spatial frequencies above about 300 lines/mm of the diffraction grating 24 the incident light 11 (FIG. 5) is split up into spectral colors. In daylight the matt structure causes smudging of the pure spectral colors to give pastel shades to practically white scatter light independently of the spatial frequency of the diffraction grating 24. The pastel shades involve a progressively increasing white component with a decreasing spatial frequency in respect of the diffraction grating 24. If the spatial frequency falls below the value of about 300 lines/mm, no noticeable division of the incident light 11 occurs, that is to say the surface element 12 is visible in the color of the incident light 11.

It can be seen from the Fourier space representation that, in the case of the surface element 12, both upon tilting about an axis which is in the plane defined by the co-ordinates x and y and also upon a rotary movement about the surface normal 17 (FIG. 6), the light which is deflected by the diffraction structure 25 remains visible to the observer over a large angular range, for example from the range between ±20° and ±60°, in contrast to diffractive gratings in accordance with above-mentioned EP 0 105 099 A1 which are visible only in a narrow angular range of a few degrees of angle and which therefore flash when the security element 2

(FIG. 2) is tilted and rotated. The surface element 12 with the diffraction structure 25 has the advantage that the surface element 12, in the surface pattern of the security element 2, forms a virtually static pattern element.

Figure 9:
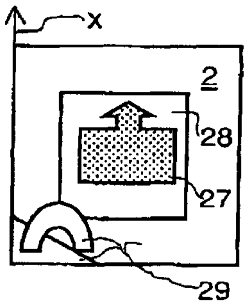
FIG. 9 shows a plan view of the security element with a pattern element.
Figure 10:
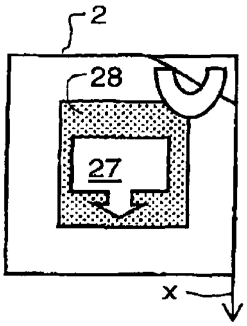
FIG. 10 shows the security element of FIG. 9 turned through 180°.

FIG. 9 shows a simple example of the virtually static pattern element, formed from two surface elements 27, 28, in the security element 2. The first surface element 27 with a first diffraction structure 25 (FIG. 7) adjoins the second surface element 28 with a second diffraction structure 25. The first surface element 27 and the second surface element 28 are arranged with areas 29 occupied with other optically effective structures, in a surface pattern on the security element 2. The first and second diffraction structures 25 differ only by virtue of the direction of their grating vector 26 (FIG. 3) and have the diffraction characteristics shown in FIG. 8. The grating vectors 26 are in substantially anti-parallel relationship in FIG. 9 in the surface elements 27, 28, that is to say the azimuth of the second diffraction structure 25 (FIG. 7) is equal to the sum of the azimuth of the first diffraction structure 25 and an additional azimuth angle θ (FIG. 3) from the range of values of between 120° and 240°, wherein the value for the azimuth angle θ=180° is to be preferred. The grating vector 26 of the first diffraction structure 25 is oriented in parallel relationship with the co-ordinate x. The matt structure extends homogenously over the entire area of the two surface elements 27, 28. The observer looks in the direction of the co-ordinate x and sees the first surface element 27 with a low level of surface brightness, but in contrast sees the second surface element 28 with a high level of surface brightness, as is indicated by the dot raster used in FIGS. 9 and 10. If now the security element 2 is turned through 180° in its plane, as indicated in FIG. 10, the security element 2 is viewed in opposite relationship to the direction of the co-ordinate x. The levels of surface brightness of the two surface elements 27, 28 are then interchanged, that is to say the contrast between the two surface elements 27, 28 is reversed in comparison with the view in FIG. 9.

In the following embodiments by way of example both the parameters of the asymmetrical diffraction gratings 24 (FIG. 1) and also the parameters of the various matt structures are variable in dependence on the location within the surface element 12, or from one surface element 12, 27, 28 to the other, independently of each other or coupled together, as shown in Table 1, in order to achieve easily observable different, striking, optical effects in respect of the virtually static pattern elements.

TABLE 1

Examples (overview)

| Example | Asymmetrical diffraction grating 24 (FIG. 1) | Matt structure |
|---|---|---|
| 1 | homogenous | homogenous and isotropic |
| 2 | locally varied (degree of surface coverage or profile shape) | homogenous and isotropic |
| 3 | homogenous | locally varied |
| 4 | locally varied (orientation of the grating vector 26) | locally varied |
| 5 | locally varied (profile depth) | homogenous and anisotropic |

Figure 11:
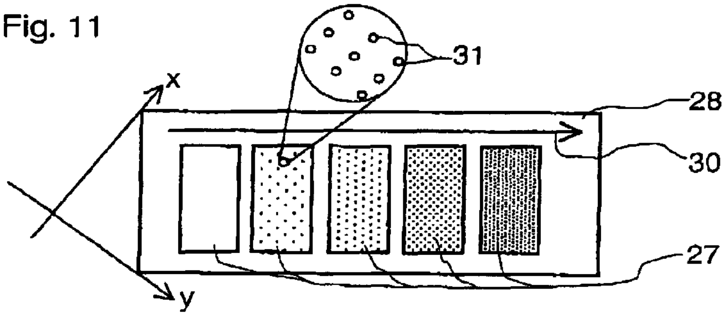
FIG. 11 shows a second embodiment of the pattern element.

In a second embodiment in the quasi static pattern element of FIG. 11 a multiplicity of the first surface elements 27 is arranged on the second surface element 28 as a background surface, wherein the grating vectors 26 (FIG. 3) of each asymmetrical diffraction grating 24 (FIG. 1) in the diffraction structure 25 (FIG. 7) of the first surface elements 27 on the one hand and the second surface element 28 on the other hand are oriented in substantially anti-parallel relationship. In one embodiment the first surface elements 27 have in a preferred direction 30 a degree of surface coverage of the diffraction structure 25, which decreases from one surface element 27 to another surface element 27, which can be achieved by inserting a multiplicity of surface portions 31 of sizes in at least one dimension of less than 0.3 mm into the first surface elements 27. The diffraction structure 25 of the second surface element 28 is shaped in the surface portions 31. The small surface portions 31 are not perceptible by the naked eye but they effectively reduce the level of surface brightness of the first surface elements 27. A similar effect is achieved in another embodiment by altering the asymmetry of the profile shape of the diffraction grating 24 from one surface element 27 to another surface element 27 in the preferred direction. The profile shape of the diffraction grating 24 changes from a first strongly asymmetrical shape by way of a symmetrical profile to a shape which is of mirror image symmetry in relation to the first asymmetrical shape again. The level of surface brightness of the first surface elements 27 therefore decreases in the preferred direction. The matt structure in contrast extends homogenously over the entire virtually static pattern element. Upon rotation of the pattern element through 180° in the plane defined by the co-ordinates x and y, the contrasts between the first surface elements 27 and the second surface element 28 changes strikingly from the point of view of the observer.

Figure 12:
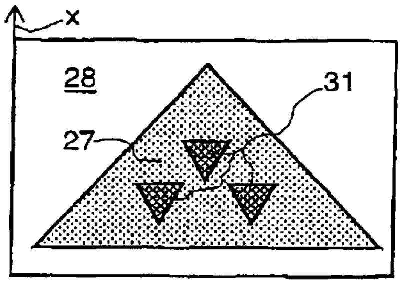
FIG. 12 shows a third embodiment of the pattern element.
Figure 13:
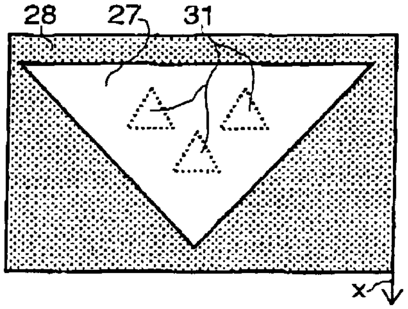
FIG. 13 shows the third embodiment of the pattern element turned through 180°.

In the third example of the virtually static pattern element shown in FIG. 12, at least one surface portion 31 is arranged within the first surface element 27. The first surface element 27 and the surface portions 31 differ only by virtue of the scatter property of the matt structure used for producing the diffraction structure 25 (FIG. 7). For example, in the first surface element 27, a strongly scattering matt structure is superimposed on the asymmetrical diffraction grating 24 (FIG. 7) while in the surface portion 31 a weakly scattering matt structure is superimposed on the asymmetrical diffraction grating 24. As long as the observer remains within the smaller one of the two solid angles 16 (FIG. 4) upon tilting or rotary movement of the pattern element or the security element 2 (FIG. 9), the surface portions 31 can be clearly recognized against the background of the first surface element 27, because of their higher level of surface brightness. Outside the smaller solid angle 16 (FIG. 4), but still within the larger solid angle 16 of the diffraction structure 25 in the first surface element 27, the contrast between the surface portions 31 and the first surface element 27 is interchanged so that the surface portions 31 are seen as being dark against the light background of the surface of the first surface element 27. The surface portions 31 can form a text, logo and so forth and involve at least a text height of 1.5 mm for good recognizability; that requires correspondingly large surface elements 27, 28. With spatial frequencies below about 300 lines/mm the contrast between the first surface element 27 and the surface portions 31 disappears outside the larger solid angle 16 of the diffraction structure 25 in the first surface element 27; from the point of view of the observer the first surface element 27 and the surface portions 31 are uniformly dark, for example even, as shown in FIG. 13, after the rotary movement of the security element 2 (FIG. 1) into the region of the azimuth angle θ of about 180°. Advantageously, as in the first example, the first surface element 27 will adjoin the second surface element 28 in order to still maintain an additional change in contrast between the first and second surface elements 27, 28, which makes it easier for the observer to find the information contained in the surface portions 31.

Figure 14:
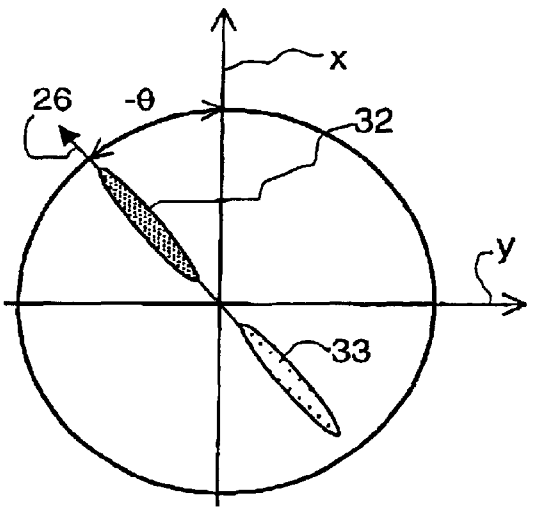
FIG. 14 shows the Fourier space representation of another diffraction structure.

In FIG. 14 the relief elements of the matt structure in the diffraction structure 25 (FIG. 7) have a preferred direction which is oriented onto the grating vector 26 with the azimuth θ. The microscopically fine relief structure elements of the matt structure are oriented perpendicularly to the grating vector 26 of the asymmetrical diffraction grating 24 (FIG. 1). The scattered incident light 11 (FIG. 6) therefore involves an anisotropic distribution. In the Fourier space representation in FIG. 14 the solid angles 32 and 33, which are predetermined by the scatter capability of the matt structure, of the two diffraction orders 14 (FIG. 3) are spread in the form of an ellipse along the grating vector 26. The main axis of the ellipse of the solid angles 32 and 33 transversely with respect to the grating vector 26 is very small so that the surface element 12 (FIG. 2) is visible in the scattered light in a large angular range upon tilting about an axis transversely with respect to the grating vector 26 and only in a narrow range in the azimuth. The intensity $I^+$ of the beams 21 (FIG. 6) diffracted into the solid angle 32 of the positive diffraction order 12 (FIG. 3) is greater by the factor p than the intensity $I^-$ of the beams 20 (FIG. 6) diffracted into the solid angle 33 of the negative diffraction order 12.

Figure 15:
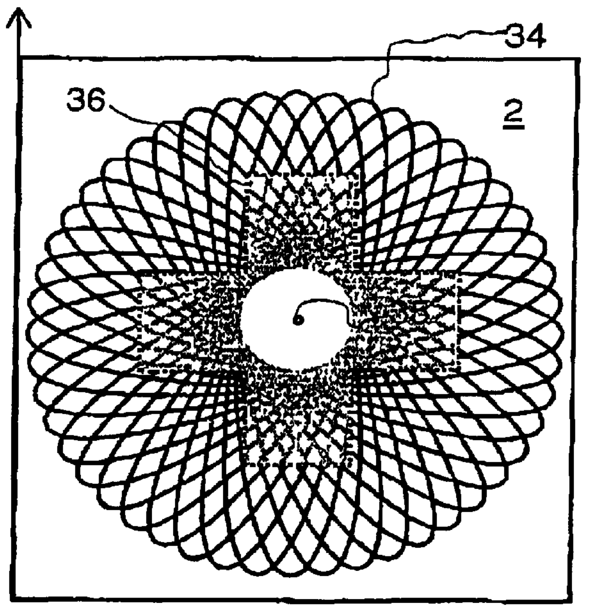
FIG. 15 shows a surface pattern as a fourth embodiment.

FIG. 15 shows an application of that diffraction structure 25. A multiplicity of elliptical narrow bands 34 which are closed in themselves forms the surface pattern of the security element 2. The bands 34 are arranged distributed uniformly in the azimuth in such a way that their centers of gravity 35 coincide. Each band has an azimuth in respect of the grating vector 26, which is predetermined by the main axis azimuth angle, for example the bands 34 with the main axis azimuth angles 0°, 45°, 90° and 135° form a group and involve the same azimuth of the grating vector 26 (FIG. 14) with θ=0°. The four bands 34 with the same azimuth of the grating vector 26 are visible at the same time from the same direction. The surface of each of the bands 34 forms the above-described pattern element and is divided into the two surface elements 27 (FIG. 9), 28 (FIG. 9). Division into the two surface elements 27, 28 which are occupied by the diffraction structures 25 (FIG. 7) is effected along a contour 36 in a predetermined shape, for example a simple logo, a letter, a digit and so forth, the shape of a cross being selected for example for the contour 36 shown in FIG. 15. A part of the band 34, which is outside the cross, is in the form for example of the first surface element 27 and the part of the band 34, which is within the cross, is in the form of the second surface element 28. The direction of the grating vectors 26 of the diffraction structures 25 in the first surface elements 27 and of the diffraction structures 25 in the second surface elements 28 are in substantially anti-parallel relationship in each band 34. The relief elements of the matt structures are oriented transversely with respect to the grating vector 26 in each band 34. When the security element 2 is turned, the observer sees as briefly flashing those respective groups of bands 34 whose diffraction plane 17 (FIG. 6) coincides with the observation direction of the observer, that is to say in relation to the observation direction of the observer the grating vectors 26 of the visible bands 34 involve the azimuth θ=0° and 180° respectively. The level of brightness of the band portions which are within the contour 36 is for example greater than that of the band portions outside the contour 36. When the security element is tilted no change in the contrast occurs, but in the mixed color perceived by the observer as long as the direction of view of the observer remains within the solid angle 32 (FIG. 14) of the positive diffraction order. As soon as the direction of view of the observer coincides with directions within the solid angle 33 (FIG. 14) of the negative diffraction order the contrast between the band portions within the contour 36 and the band portions outside the contour 36 is interchanged, that is to say the band portions within the contour 36 are less light than the band portions outside it. Outside the solid angles 32 and 33 the surfaces of the bands 34 are uniformly dark or cannot be observed.

Figure 16:
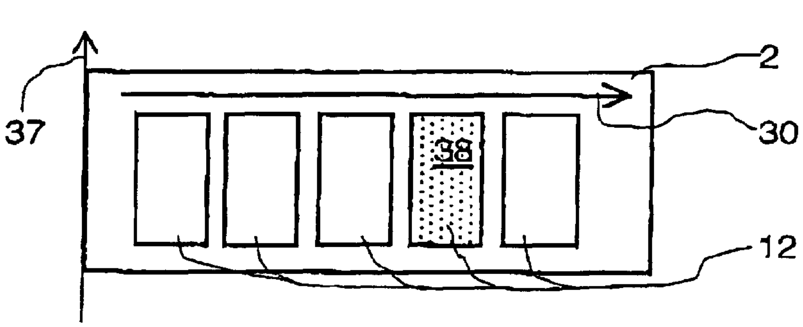
FIG. 16 shows a fifth configuration of the pattern element.

FIG. 16 shows the fifth example. A plurality of the surface elements 12 is arranged within the surface pattern of the security element 2 in a predetermined manner along the preferred direction 30, wherein adjacent surface elements 12 are oriented in spaced relationship or in immediately abutting relationship. In each surface element 12 the diffraction grating 24 (FIG. 1) used for the diffraction structure 25 (FIG. 7) is of a different profile, wherein the blaze angle $\epsilon_2$ (FIG. 7) of the broader profile flank changes from one surface element 12 to the adjacent surface element 12 between the extreme values $\pm\epsilon_{2Max.}$ in steps by one of the predetermined blaze angle steps $\Delta\epsilon_2$. By way of example, in the drawing in FIG. 16 in the central surface element 12 the blaze angles $\epsilon_1$ (FIG. 7) and $\epsilon_2$ of the diffraction structure 25 are equal to zero, that is to say the diffraction structure 25 in the central surface element 12 is a flat mirror, superimposed with the matt structure. The diffraction structures 25 of the two outer surface elements 12 involve the blaze angle $+\epsilon_{2Max.}$ and $-\epsilon_{2Max.}$. The matt structure is homogenous in all surface elements 12 and anisotropic, as described with reference to FIG. 5. The elliptical solid angles 16 (FIG. 5) of each of the surface elements 12 are arranged in displaced mutually juxtaposed relationship in the Fourier space representation along the co-ordinate x (FIG. 5), in a manner corresponding to the blaze angle $\epsilon_2$ of the diffraction structure 25. The grating vectors 26 (FIG. 3) are oriented in substantially parallel and anti-parallel relationship respectively with the preferred direction 30. When the security element 2 is tilted about an axis 37 oriented transversely with respect to the preferred direction 30, one of the surface elements 12 after the other lights up brightly for the observer viewing in the preferred direction 30 so that the observer sees a light strip 38 moving in the preferred direction on the security element 2. When the security element is tilted about the preferred axis 30 the strip 38 remains visible in a large tilt angle which is dependent on the solid angle 16.

Instead of the isotropic matt structures used in the foregoing examples, it is also possible to use anisotropic matt structures. Conversely, anisotropic matt structures used in the foregoing examples can be replaced by isotropic matt structures.

What is claimed is:

1. A diffractive security element comprising a plastic laminate with a surface pattern which is composed mosaic-like at least from surface elements wherein in the surface elements a reflecting interface between a shaping layer and a protective layer of the plastic laminate forms optically effective structures and light which is incident on the plastic laminate and which passes through a cover layer of the plastic laminate and through the shaping layer is deflected in a predetermined manner by means of the optically effective structures, wherein shaped in the surface of at least one of the surface elements is a diffraction structure which is produced by a superimposition of a linear asymmetrical diffraction grating with a matt structure, the linear asymmetrical diffraction grating has a spatial frequency from the range of values of between 50 lines/mm and 2,000 lines/mm, and the matt structure has a mean roughness value from the range of between 20 nm and 2,000 nm and at least in one direction a correlation length of between 200 nm and 50,000 nm.

2. A security element as set forth in claim 1, wherein a second surface element adjoins a first surface element, the diffraction structure is shaped in the surface of the second surface element and the grating vector of the linear asymmetrical diffraction grating in the first surface element is oriented in substantially anti-parallel relationship with the grating vector of the linear asymmetrical diffraction grating in the second surface element.

3. A security element as set forth in claim 2, wherein a plurality of the first surface elements is arranged on the surface of the second surface element, the first surface elements in a raster contain a plurality of surface portions with a largest size in at least one dimension of less than 0.3 mm, that the diffraction structure of the second surface element is formed in the surface portions, and that along a preferred direction the degree of surface coverage of the diffraction structure of the first surface element differs from one surface element to another surface element.

4. A security element as set forth in claim 2, wherein a plurality of the first surface elements is arranged on the surface of the second surface element and that along a preferred direction the asymmetry of the diffraction gratings which are used for the diffraction structure in the first surface elements changes from one surface element to another surface element.

5. A security element as set forth in claim 1, wherein surface portions with a diffraction structure are arranged in the surface element, wherein the diffraction structure of the surface portions differs from the diffraction structure of the surface element only by virtue of the scatter capability of the matt structure.

6. A security element as set forth in claim 5, wherein the surface portions form information in the form of a logo or text.

7. A security element as set forth in claim 1, wherein a plurality of the surface elements are arranged in mutually juxtaposed relationship on the surface of the surface pattern and that along a preferred direction a blaze angle of the asymmetrical diffraction grating which is used for the diffraction structure in the surface element is changed from one surface element to the other surface element by one of the predetermined blaze angle steps.

8. A security element as set forth in claim 1, wherein the matt structure is isotropic.

9. A security element as set forth in claim 1, wherein the matt structure is anisotropic.

10. A security element as set forth in claim 1, wherein the diffraction grating is achromatic and has a spatial frequency of between 50 lines/mm and 300 lines/mm.

11. A security element as set forth in claim 1, wherein the interface is a coating of a material from the group aluminum, silver, gold, chromium or tantalum.

* * * * *